Feb. 13, 1968 P. VULLIEZ 3,368,413
MOTION-TRANSMISSION SYSTEM
Filed Feb. 3, 1966
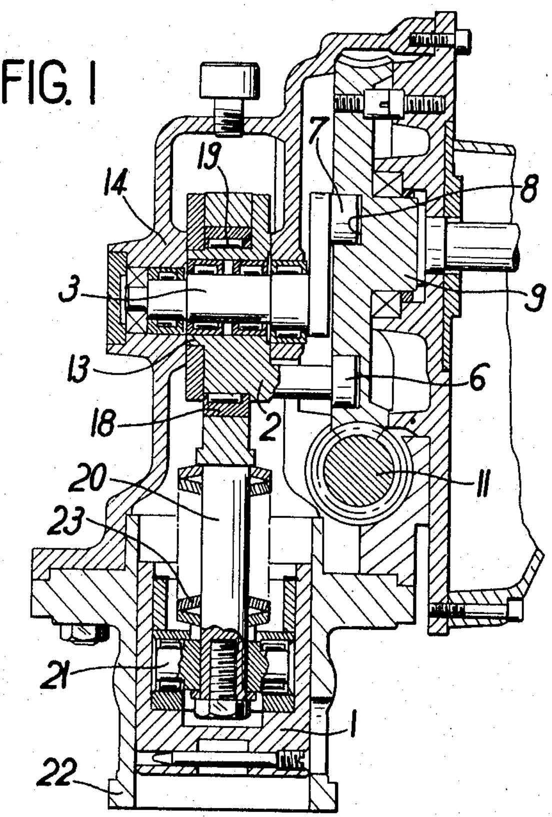
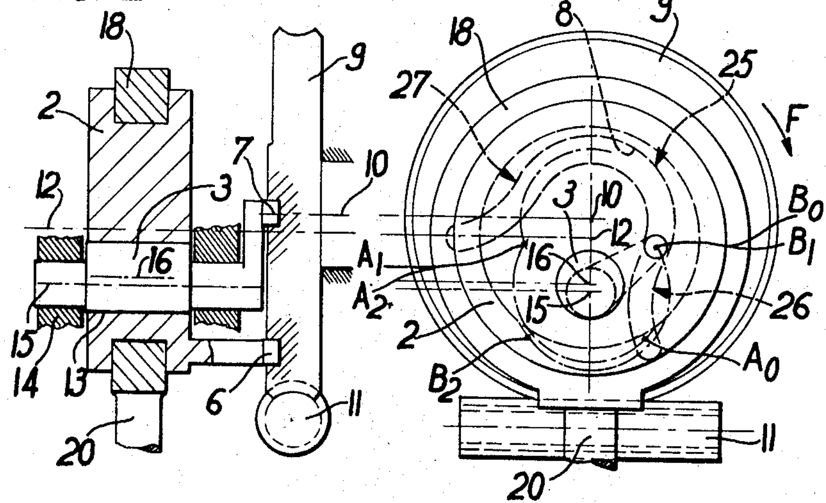

3,368,413
Patented Feb. 13, 1968

3,368,413

MOTION-TRANSMISSION SYSTEM

Paul Vulliez, Pont-Audemer, France, assignor of one-half to Commissariat à l'Energie Atomique Filed Feb. 3, 1966, Ser. No. 524,808
Claims priority, application France, Feb. 19, 1965, 6,184
3 Claims. (Cl. 74—55)

ABSTRACT OF THE DISCLOSURE

A valve gate is moved rapidly toward closed position and seated slowly by a first disc mounted on a stationary eccentric axis and a second disc mounted eccentrically on the first disc. Each disc has a roller engaging a cam and the cam is rotated to open or close the valve, the second disc being connected to the valve gate.

The present invention is directed to a motion-transmission system which is particularly suitable for operating valve gates.

Automatic closure of valves can be produced both rapidly and efficiently by virtue of the system provided by this invention, wherein a single movement of rotation performed at uniform speed can be transformed into a rectilineal translational movement of a valve gate at variable speed.

Said translational movement can thus consist in a first stage of approach of the valve gate towards its seating at a relatively high speed, the resistances to be overcome during this stage of motion being of a very low order, and a second stage in which the translational movement is carried out at a much lower speed with transmission of effort in such a manner as to apply the valve gate against its seating.

The motion-transmission system in accordance with the invention consists of a mechanism which is mainly applicable to the control of a valve gate, characterized in that it comprises a first disc which is rotatable about a stationary eccentric axis, a second disc which is rotatably mounted on said first disc and set in eccentric relation thereto, a collar which is rotatably mounted on said second disc and coupled to a controlled member, means for guiding said controlled member in rectilineal motion and means for alternately driving each of said two discs in rotation.

In accordance with a secondary characteristic feature of the invention, the system comprises a motion-transmission mechanism as hereinabove defined, characterized in that it comprises a positive-drive cam for driving and guiding two rollers which are integral respectively with said two discs and means for driving said cam in rotation.

One particular form of embodiment of the system according to the invention will now be described below in reference to FIGS. 1 to 3 of the accompanying drawings. The form of embodiment described has been chosen solely by way of example and is not intended to constitute any limitation of the invention.

FIG. 1 is a longitudinal sectional view of the motion-transmission system in accordance with the invention.

FIG. 2 is a more diagrammatic view of the same system.

FIG. 3 is a transverse sectional view looking on the right-hand side of the system of FIG. 1 and showing in particular the profile of the positive-drive cam.

The system herein described is employed for the purpose of controlling the closure or opening of the gate of a valve (not shown) by means of a piston 1. Said system comprises two vertical eccentrics 2 and 3 which are capable of moving in rotation relatively to each other.

Said two eccentrics are provided with crank-pins on which are fitted rollers 6 and 7 respectively. Said rollers are adapted to engage in a groove 8 which is cut in a vertical wheel 9 and constitutes the positive-drive cam which will be described in greater detail hereinafter.

The wheel 9 can be driven in rotation about its axis 10 by means of a wormscrew 11 which engages with a set of teeth provided at the exterior of the wheel and which is driven by a motor (not shown in the drawings) or by means of a hand-wheel.

The large eccentric 2 is formed by a vertical disc having an axis 12 and comprising an eccentric bore 13, there being rotatably mounted within said bore a second disc which constitutes the small eccentric 3. Said small eccentric is journalled in a stationary case 14 and is consequently capable of rotating about the stationary axis 15 of the journal-bearings, whilst the large eccentric 2 is capable of rotating about the axis 16 of the small eccentric.

A collar 18 is fitted in a peripheral channel 19 of the large eccentric 2 and is freely rotatable with respect to this latter. A connecting-rod 20 which is integral with the collar 18 is coupled by means of a knuckle-joint 21 to the piston 1 which is movable within a vertical guide 22. The collar 18 and connecting-rod 20 thus transmit to the piston 1 the movements of the large eccentric 2 which are carried out in a substantially vertical direction. This motion transmission takes place by means of an assembly of flexible washers 23 which maintains the valve gate applied against its seating in the closed position thereof.

The profile of the positive-drive cam 8 (as shown in FIG. 3) is so designed that, during the movement of rotation of the wheel 9, said cam alternately drives one of the rollers 6 and 7 while the other roller remains substantially stationary. In a particular case which is shown by way of example in FIG. 3, the cam 8 comprises a central portion formed by a semi-circle 25 and two symmetrical end-portions 26 and 27 formed by circular arcs which are curved in opposite directions. The center of the semi-circle 25 coincides with the axis of rotation 10 of the wheel 9.

When the valve is in the open position, the rollers 6 and 7 are located respectively in the positions indicated by the references $A_0$ and $B_0$ in FIG. 3. $A_0$ being located on the circular arc 26 of the cam and $B_0$ being located at the extremity of the semi-circle 25.

In order to produce the closure of the valve, the wheel 9 is driven in rotation in the direction of the arrow F. One virtually full revolution of the wheel corresponds to the complete closure of the valve.

During a first stage of the movement which corresponds to the first half-revolution of the wheel 9, the roller 7 describes the semi-circle 25 while this latter rotates about its center 10; said roller therefore remains motionless and its position $B_1$ coincides with $B_0$ on completion of the half-revolution. The small eccentric 3 is therefore stationary. During said half-revolution of the wheel 9, the roller 6 is driven by the arc 26 from $A_0$ to $A_1$ in a rotational movement through an angle of 180° in the case described about the stationary axis 16 of the small eccentric. The same applies to the large eccentric 2 which thus moves downward over a distance which is equal to twice its eccentric displacement. Since said eccentric displacement is great compared with that of the small eccentric 3, the piston 1 moves downward rapidly and moves the valve gate towards its seating.

As the wheel 9 continues to rotate, the roller 6 engages in its turn in the semi-circle 25 and remains practically motionless at $A_1$ during the second stage of the movement. In fact, the roller oscillates slightly within the cam from this position $A_1$ in such a manner as to follow the movement which is imparted to the large eccentric 2 by the small eccentric 3. In fact, the roller 7 is driven by the end circular arc 27 of the cam from $B_1$ to $B_2$ about the axis 15, thus drawing with it in this movement of rotation the small eccentric 3 and consequently the large eccentric 2 which thus moves downward together with the collar 18 and piston 1 over a distance which is equal at a maximum to twice the eccentric displacement or radial distance between the axes 15 and 16. Since said radial distance is small, the downward motion of the piston takes place at a low speed. The pressure with which the valve gate is applied against its seating is exerted at the end of travel by means of flexible washers 23.

What we claim is:

1. Motion-transmission system comprising a first disc which is rotatable about a stationary eccentric axis, a second disc which is rotatably mounted on said first disc and set in eccentric relation thereto, a collar which is rotatably mounted on said second disc and coupled to a controlled member, means for guiding said controlled member in rectilinear motion and means for alternately driving each of said two discs in rotation, said last named means comprising a positive-drive cam for driving and guiding two rollers which are integral respectively with said two discs and means for driving said cam in rotation.

2. Motion-transmission system in accordance with claim 1, wherein said positive-drive cam has an undulated profile, one of the rollers being maintained stationary while the other roller describes a circular arc and conversely at the time of rotation of the cam so that a uniform movement of rotation of said cam produces a movement of translation of the controlled member at two different successive speeds.

3. Motion-transmission system as described in claim 2 including a piston connected to said controlled member for opening and closing a valve.

References Cited

UNITED STATES PATENTS

| | | | |
|---|---|---|---|
| 2,592,237 | 4/1952 | Bradley | 74—571 |
| 2,834,223 | 5/1958 | Strand | 74—571 |

FOREIGN PATENTS

| | |
|---|---|
| 1,226,460 | France. |
| 1,241,293 | France. |

FRED C. MATTERN, Jr., *Primary Examiner.*

W. S. RATLIFF, *Assistant Examiner.*